United States Patent
Park et al.

(10) Patent No.: US 9,534,823 B2
(45) Date of Patent: Jan. 3, 2017

(54) MOTOR DRIVING DEVICE AND AIR CONDITIONER INCLUDING THE SAME

(71) Applicant: LG ELECTRONICS INC., Seoul (KR)

(72) Inventors: Gwigeun Park, Seoul (KR); Jaeboo Eom, Seoul (KR); Kihong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/733,570

(22) Filed: Jun. 8, 2015

(65) Prior Publication Data

US 2015/0354881 A1    Dec. 10, 2015

(30) Foreign Application Priority Data

Jun. 9, 2014    (KR) .................. 10-2014-0069655

(51) Int. Cl.
*H02P 1/24* (2006.01)
*F25B 49/02* (2006.01)
*H02P 27/06* (2006.01)
*F24F 11/00* (2006.01)
(Continued)

(52) U.S. Cl.
CPC .......... *F25B 49/025* (2013.01); *F24F 11/0009* (2013.01); *H02P 3/22* (2013.01); *H02P 27/06* (2013.01); *F25B 13/00* (2013.01); *F25B 2600/02* (2013.01); *F25B 2600/021* (2013.01); *F25B 2600/024* (2013.01); *F25B 2700/151* (2013.01)

(58) Field of Classification Search
CPC ............. F24F 11/0009; F25B 2600/024; F25B 2600/021; F25B 49/075; H02P 6/04; H02P 27/06

See application file for complete search history.

(56) References Cited

U.S. PATENT DOCUMENTS 8,473,132 B2*  6/2013  Ichikawa ............... B60K 6/445
                                                    180/65.25
2012/0236615 A1*  9/2012  Kitabatake ............ H01L 27/088
                                                    363/131
2014/0021888 A1  1/2014  Niwa et al.
(Continued)

FOREIGN PATENT DOCUMENTS

WO    WO 2012/127665 A1    9/2012

OTHER PUBLICATIONS

European Search Report dated Jan. 18, 2016 issued in Application No. 15 171 082.9.

*Primary Examiner* — Karen Masih
(74) *Attorney, Agent, or Firm* — KED & Associates LLP

(57) ABSTRACT

A motor driving device and an air conditioner including the same are disclosed. The motor driving device includes a rectifier to rectify input AC power, a boost converter to boost power rectified by the rectifier, a capacitor to store a pulsating voltage from the boost converter, an inverter comprising a plurality of switching elements, the inverter transforming AC power, using a voltage across the capacitor, and outputting the transformed power to a motor, a regenerative power consuming unit arranged between the capacitor and the inverter, to consume regenerative power from the motor, and a switching driving unit to output a switching control signal to a switching element in the regenerative power consuming unit while outputting an operation control signal to an inverter controller when the voltage across the capacitor is equal to or higher than a predetermined voltage.

20 Claims, 14 Drawing Sheets

(51) Int. Cl.
*H02P 3/22* (2006.01)
*F25B 13/00* (2006.01)

(56) References Cited

U.S. PATENT DOCUMENTS

2014/0070751 A1 3/2014 Niwa et al.

\* cited by examiner (a)                          (b)

$V_{dc} \geqq V_{ref}$ $V_{dc} < V_{ref}$

MOTOR DRIVING DEVICE AND AIR CONDITIONER INCLUDING THE SAME

CROSS-REFERENCE TO RELATED APPLICATION(S)

This application claims the priority benefit of Korean Patent Application No. 10-2014-0069655, filed on Jun. 9, 2014 in the Korean Intellectual Property Office, the disclosure of which is incorporated herein by reference.

BACKGROUND

1. Field

The present invention relates to a motor driving device and an air conditioner including the same, and more particularly to a motor driving device capable of consuming regenerative power and an air conditioner including the same.

2. Background

An air conditioner is installed to provide a pleasant indoor environment to persons by adjusting indoor temperature and conditioning indoor air through discharge of hot or cold air into an indoor space. Generally, such an air conditioner includes an indoor unit installed in an indoor space while including a heat exchanger, and an outdoor unit including a compressor and a heat exchanger, to supply refrigerant to the indoor unit.

SUMMARY OF THE INVENTION

It is an object of the present invention to provide a motor driving device capable of consuming regenerative power and an air conditioner including the same.

In accordance with an aspect of the present invention, the above and other objects can be accomplished by the provision of a motor driving device including a rectifier to rectify input AC power, a boost converter to boost power rectified by the rectifier, a capacitor to store a pulsating voltage from the boost converter, an inverter including a plurality of switching elements, the inverter transforming AC power, using a voltage across the capacitor, and outputting the transformed power to a motor, a regenerative power consuming unit arranged between the capacitor and the inverter, to consume regenerative power from the motor, and a switching driving unit to output a switching control signal to a switching element in the regenerative power consuming unit while outputting an operation control signal to an inverter controller when the voltage across the capacitor is equal to or higher than a predetermined voltage.

In another aspect of the present invention, there is provided an air conditioner including a compressor to compress a refrigerant, a heat exchanger to perform heat exchange, using the compressed refrigerant, and a compressor motor driving device to drive equipped in the compressor, wherein the compressor motor driving device includes a rectifier to rectify input AC power, a boost converter to boost power rectified by the rectifier, a capacitor to store a pulsating voltage from the boost converter, an inverter including a plurality of switching elements, the inverter transforming AC power, using a voltage across the capacitor, and outputting the transformed power to a motor, a regenerative power consuming unit arranged between the capacitor and the inverter, to consume regenerative power from the motor, and a switching driving unit to output a switching control signal to a switching element in the regenerative power consuming unit while outputting an operation control signal to an inverter controller when the voltage across the capacitor is equal to or higher than a predetermined voltage.

BRIEF DESCRIPTION OF THE DRAWINGS

Embodiments will be described in detail with reference to the following drawings in which like reference numerals refer to like elements and wherein.

The above and other objects, features and other advantages of the present invention will be more clearly understood from the following detailed description taken in conjunction with the accompanying drawings, in which.

DETAILED DESCRIPTION

Hereinafter, the present invention will be described with reference to the drawings for explaining cell module assemblies according to embodiments of the present invention.

Although "module" or "unit" is suffixed to constituent elements described in the following description, this is intended only for ease of description of the specification. The suffixes themselves have no meaning or function to distinguish the constituent element using the suffix from the constituent element using no suffix. The suffixes "module" and "unit" may be used interchangeably.

Figure 1:
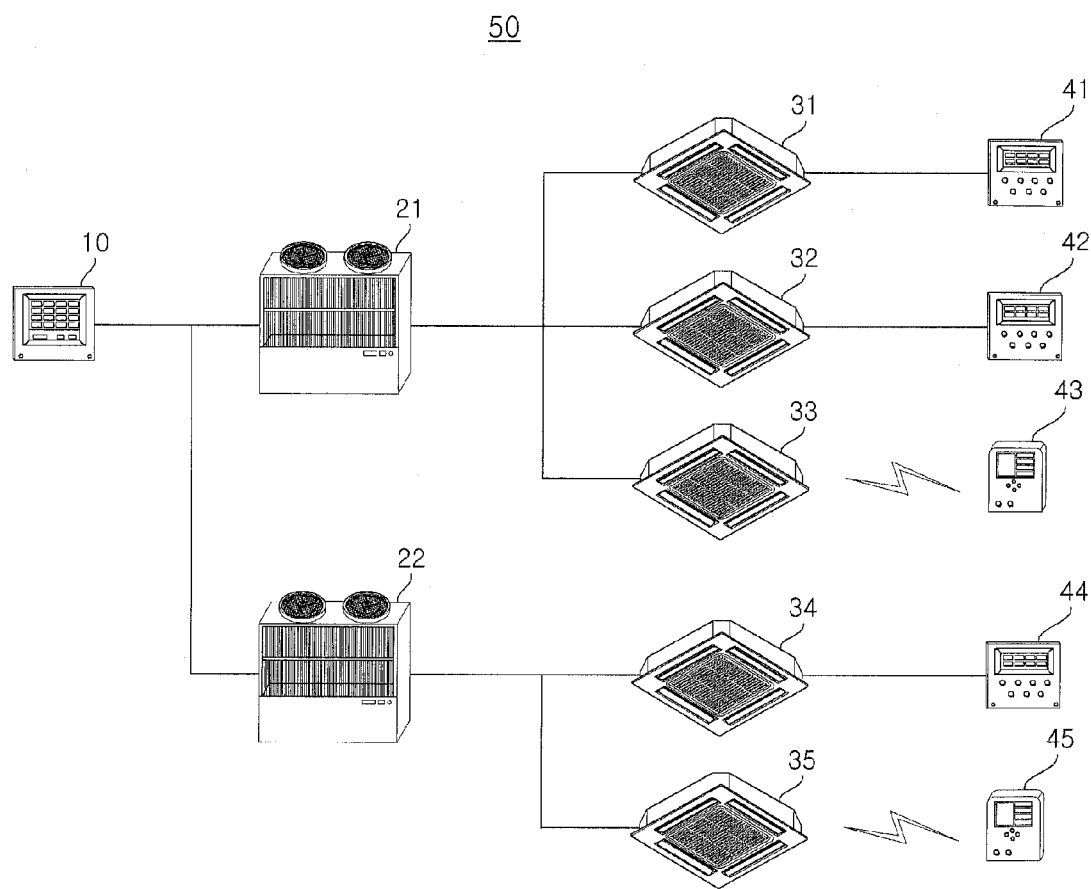
FIG. 1 is a view illustrating a configuration of an air conditioner according to an embodiment of the present invention.

FIG. 1 is a view illustrating a configuration of an air conditioner according to an embodiment of the present invention.

The air conditioner according to the embodiment of the present invention illustrated in FIG. 1 is a large-size air conditioner. As illustrated in FIG. 1, the air conditioner, which is designated by reference numeral "50", may include a plurality of indoor units 31 to 35, a plurality of outdoor units 21 and 22 each connected to associated ones of the indoor units 31 to 35, and remote controllers 41 to 45 connected to respective indoor units 31 to 35. The air conditioner 50 may further include a remote control unit 10 to control the indoor units 31 to 35 and outdoor units 21 and 22.

The remote control unit 10 is connected to the indoor units 31 to 36 and outdoor units 21 and 22, and monitors and controls operations of the indoor units 31 to 36 and outdoor units 21 and 22. In this case, the remote control unit 10 may perform operation setting, lock setting, schedule control, group control, etc. for the indoor units 31 to 36 connected thereto.

As the air conditioner, any one of a stand type air conditioner, a wall-mounted air conditioner and a ceiling-mounted air conditioner is applicable. For convenience of description, however, the following description will be given only in conjunction with a ceiling-mounted air conditioner. Meanwhile, the air conditioner may further include at least one of a ventilator, an air cleaner, a humidifier, and a heater. These devices may be operatively connected to the indoor units and outdoor units.

Each of the outdoor units 21 and 22 includes a compressor (not shown) for compressing refrigerant supplied thereto, an outdoor heat exchanger (not shown) for exchanging heat between refrigerant and outdoor air, an accumulator (not shown) for separating gaseous refrigerant from refrigerant supplied thereto, and supplying the separated gaseous refrigerant to the compressor, and a 4-way valve (not shown) for selecting a flow path of refrigerant according to heating operation. Although each of the outdoor units 21 and 22 further includes a plurality of sensors, a plurality of valves, and an oil collector, etc., no description will be given of configurations of these elements.

Each of the outdoor units 21 and 22 operates the compressor and outdoor heat exchanger included therein, to perform compression and heat exchange of refrigerant, and supplies the resultant refrigerant to associated ones of the indoor units 31 to 35. Each of the outdoor units 21 and 22 is driven in accordance with a demand from the remote control unit 10 or an associated one or ones of the indoor units 31 to 35. Thus, the number of operating outdoor units and the number of operating compressors included in the operating outdoor units are varied as the cooling/heating capacity of the air conditioner is varied in accordance with the number of operating indoor units.

Although the outdoor units 21 and 22 are described in conjunction with the case in which each outdoor unit supplies refrigerant to associated ones of the indoor units 31 to 35, the connection arrangement of the outdoor units and indoor units may be varied such that the outdoor units are interconnected to supply refrigerant to each indoor unit.

Each of the indoor units 31 to 35 is connected to one of the outdoor units 21 and 22 and, as such, receives refrigerant from the outdoor unit connected thereto and discharges cold or hot air to an indoor space. Each of the indoor units 31 to 35 includes an indoor heat exchanger (not shown), an indoor fan (not shown), an expansion valve (not shown) to expand refrigerant supplied thereto, and a plurality of sensors (not shown).

Each of the indoor units 31 to 35 and an associated one of the outdoor units 21 and 22 are connected by a communication line and, as such, receive and transmit data therebetween. Each outdoor unit and each indoor unit are connected to the remote control unit 10 by a separate communication line and, as such, operate under control of the remote control unit 10.

Each of the remote controllers 41 to 45 is connected to an associated one of the indoor units 31 to 35 and, as such, may input a control command from the user to the connected indoor unit, and may receive state information from the connected indoor unit, to display the received state information. In this case, each of the remote controllers 41 to 45 communicates with the indoor unit connected thereto in a wired or wireless manner in accordance with the connection type thereof. In some cases, a single remote controller may be connected to a plurality of indoor units and, as such, setting of the plurality of indoor units may be changed by input from the single remote controller.

In addition, each of the remote controllers 41 to 45 may include a temperature sensor equipped therein.

Figure 2:
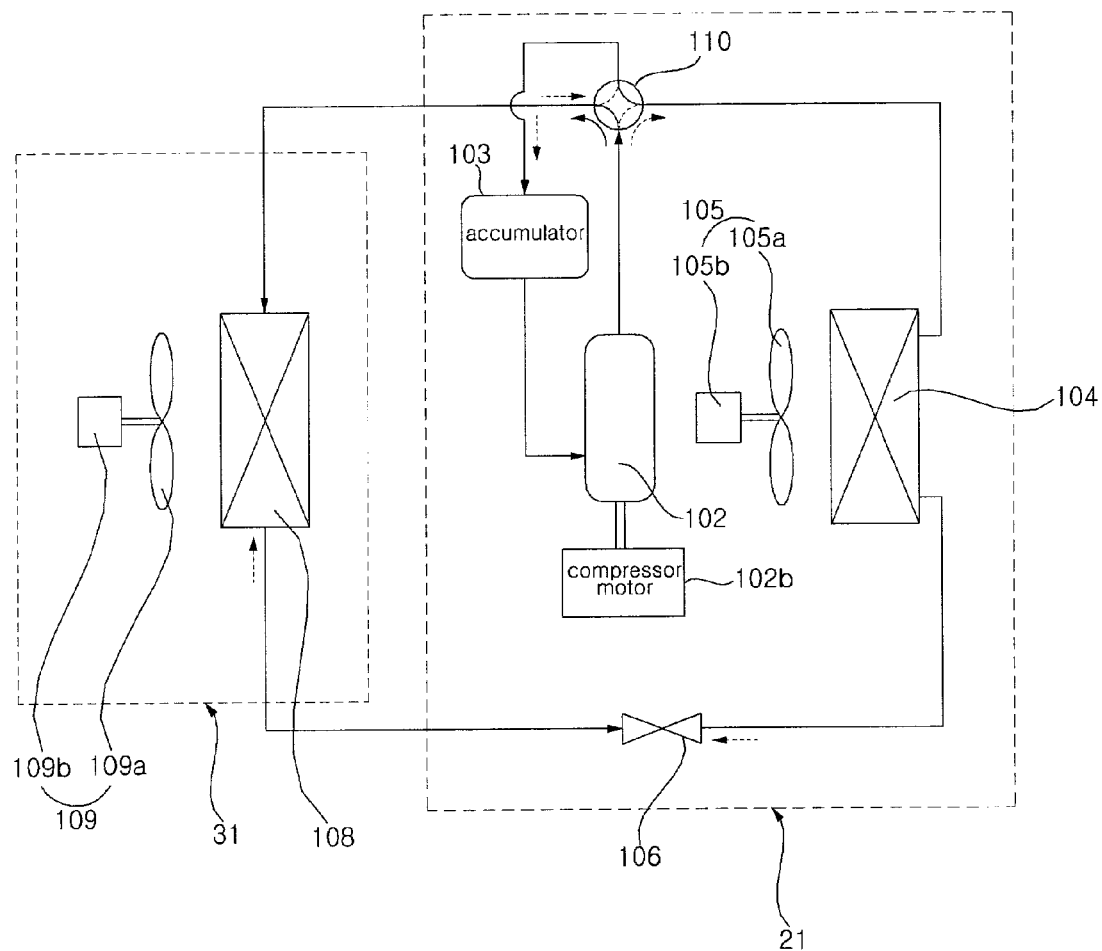
FIG. 2 is a schematic view of one outdoor unit and one indoor unit, which are included in the air conditioner of FIG. 1.

FIG. 2 is a schematic view of one outdoor unit and one indoor unit, which are included in the air conditioner of FIG. 1.

Referring to FIG. 2, the air conditioner 50 mainly includes an indoor unit, for example, the indoor unit 31, and an outdoor unit, for example, the outdoor unit 21.

The outdoor unit 21 includes a compressor 102 functioning to compress refrigerant, a compressor motor 102b to drive the compressor 102, an outdoor heat exchanger 104 functioning to discharge heat from the compressed refrigerant, and an outdoor blowing unit 105 including an outdoor fan 105a disposed at one side of the outdoor heat exchanger 104, to promote heat discharge of refrigerant, and a motor 105b to rotate the outdoor fan 105a. The outdoor unit 21 further includes an expansion device 106 to expand concentrated refrigerant, a cooling/heating switching valve 110 to change a flow path of compressed refrigerant, and an accumulator 103 to temporarily store gasified refrigerant, and then to supply the stored refrigerant to the compressor at a constant pressure after removing moisture and foreign matter from the refrigerant.

The indoor unit 31 includes an indoor heat exchanger 108 disposed in an indoor space, to perform a cooling/heating function, and an indoor blowing unit 109 including an indoor fan 109a disposed at one side of the indoor heat exchanger 108, to promote heat discharge of refrigerant, and a motor 109b to rotate the indoor fan 109a.

The indoor unit 31 may include at least one indoor heat exchanger 108. As the compressor 102, at least one of an inverter compressor and a constant speed compressor may be used.

Meanwhile, the air conditioner 50 may be configured as a cooler to cool an indoor space. Alternatively, the air conditioner 50 may be configured as a heat pump to cool or heat an indoor space.

Although one indoor unit 31 and one outdoor unit 21 are illustrated in FIG. 2, the air conditioner according to the illustrated embodiment of the present invention is not limited thereto. For example, embodiments of the present invention are applicable to a multi-type air conditioner including a plurality of indoor units and a plurality of outdoor units, and an air conditioner including a single indoor unit and a plurality of outdoor units.

The compressor 102 included in the outdoor unit 21 of FIG. 1 may be driven by a motor driving device 200 (FIG. 3A or FIG. 3B) to drive a compressor motor 250 (FIG. 3A or FIG. 3B) for driving of the compressor.

Figure 3A:
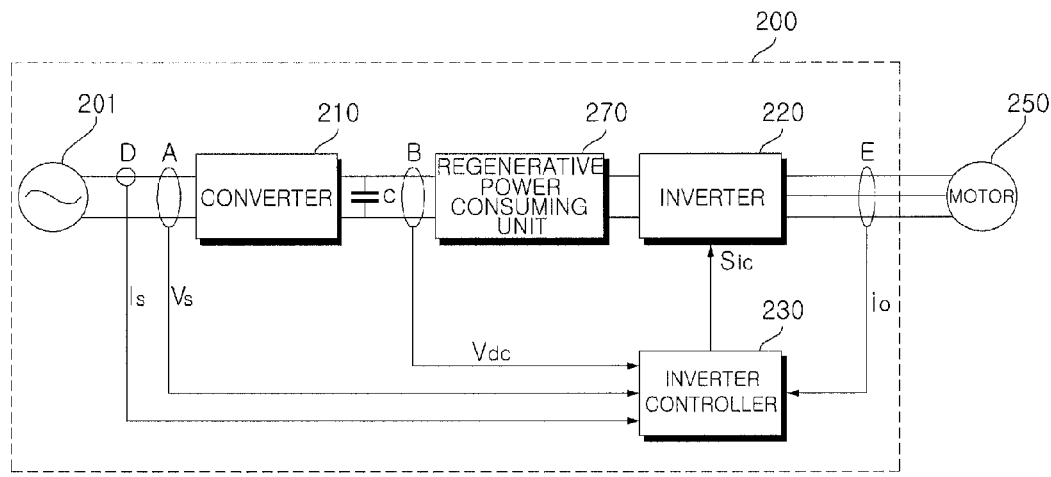
FIGS. 3A and 3B are block diagrams illustrating various examples of a motor driving device for driving a compressor included in each outdoor unit of FIG. 1.
Figure 3B:
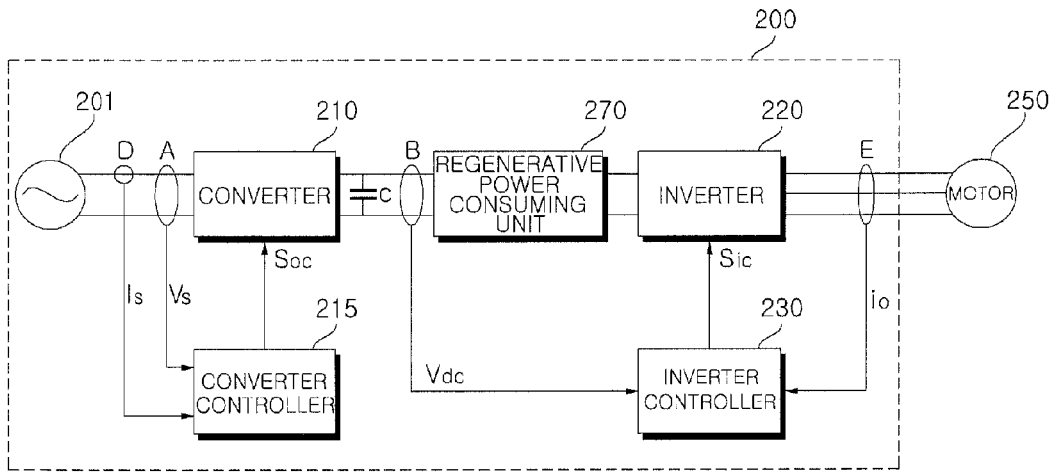

FIGS. 3A and 3B are block diagrams illustrating various examples of a motor driving device for driving the compressor included in each outdoor unit of FIG. 1.

First, the motor driving device 200, which is illustrated in FIG. 3A, may include an inverter 220 to output 3-phase AC current to the compressor motor 250, an inverter controller 230 to control the inverter 220, and a converter 210 to supply DC power to the inverter 220. The compressor motor driving device 200 may further include a converter controller 215 to control the converter 210, and a regenerative power consuming unit 270.

The motor driving device 200 receives AC power from a power supply system, converts the received power, and then supplies the converted power to the compressor motor 250. In this regard, the motor driving device 200 may be referred to as a "power converting device" or a "compressor driving device".

Meanwhile, in accordance with an embodiment of the present invention, the motor driving device 200 uses a DC link capacitor having a low capacitance of several tens of μF or less. For example, the low-capacitance DC link capacitor may include a film capacitor rather than an electrolytic capacitor.

When a low-capacitance DC link capacitor is used, DC link voltage is pulsated due to increased variation thereof and, as such, little or no smoothing operation of the DC link capacitor is achieved.

The motor driving device, which includes a DC link capacitor having a low capacitance of several tens of μF or less, as described above, may be referred to as a "capacitorless motor driving device".

The following description will be given of the motor driving device 200, which includes a low-capacitance DC link capacitor.

Figure 5A:
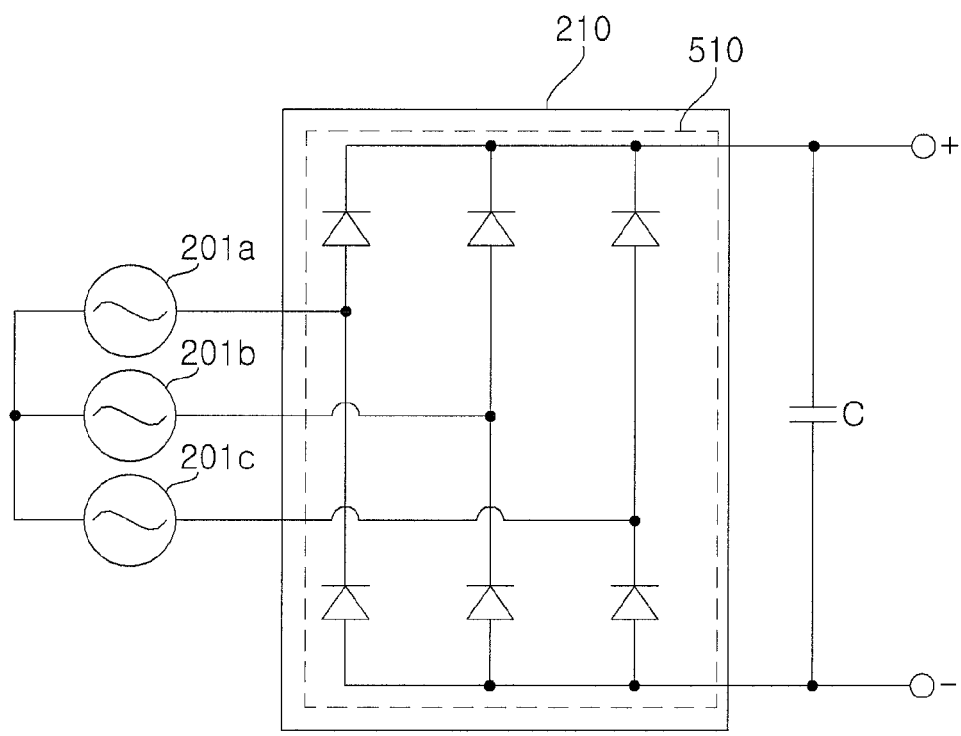
FIG. 5A is a circuit diagram illustrating an example of a converter illustrated in FIG. 3A.

In accordance with the illustrated embodiment of the present invention, the converter 210, which supplies DC power to the inverter 220, receives 3-phase AC power, and converts the received 3-phase AC power into DC power. To this end, the converter 210 may include a rectifier 510 (FIG. 5A). In addition, the converter 210 may further include a reactor (not shown).

The rectifier 510 rectifies AC power 201 input thereto, and outputs the rectified power. When the input AC power 201 is 3-phase AC power, the rectifier 510 rectifies the 3-phase AC power, and outputs the rectified power.

A capacitor C is connected to an output terminal of the converter 210. The capacitor C may store power output from the converter 210. The power output from the converter 210 is DC power and, as such, the capacitor C may be referred to as a "DC link capacitor".

The motor driving device 200 may further include an input voltage detector A in order to detect an input voltage Vs from the input AC power 201. The input voltage detector A may be arranged upstream of the rectifier 510.

For detection of voltage, the input voltage detector A may include a resistor, an operational amplifier (OP AMP), etc. The detected input voltage Vs may be a pulse type discrete signal. The detected input voltage Vs may be applied to the inverter controller 230.

Meanwhile, a zero crossing point of the input voltage may also be detected by the input voltage detector A.

The motor driving device 200 may further include an input current detector D in order to detect an input voltage Is from the input AC power 201. The input current detector D may be arranged upstream of the rectifier 510.

For detection of current, the input current detector D may include a current sensor, a current transformer (CT), a shunt resistor, etc. The detected input current Is may be a pulse type discrete signal. The detected input current Is may be applied to the inverter controller 230.

The motor driving device 200 may further include a DC voltage detector B in order to detect a pulsating voltage Vdc across the DC link capacitor C. For detection of voltage, the DC voltage detector B may include a resistor, an operational amplifier (OP AMP), etc. The detected voltage Vdc across the DC link capacitor C may be a pulse type discrete signal. The detected voltage Vdc may be applied to the inverter controller 230. An inverter switching control signal Sic may be generated, based on the DC voltage Vdc across the DC link capacitor C.

The inverter 220 may include a plurality of inverter switching elements in order to convert smoothed DC power into 3-phase AC power having a predetermined frequency and then to output the 3-phase AC power to the compressor motor 250, which may be a 3-phase motor, in accordance with ON/OFF operations of the switching elements.

In detail, the inverter 220 includes a plurality of switching elements. For example, the inverter 220 may include three pairs of arm switching elements connected in parallel. Each arm switching element pair includes an upper arm switching element and a lower arm switching element, which are connected in series. A diode is connected to each arm switching element in anti-parallel.

The inverter controller 230 may output an inverter switching control signal Sic to the inverter 220, to control switching operation of the inverter 220. The inverter switching control signal Sic is a pulse width modulated (PWM) switching control signal. The inverter switching control signal Sic may be generated, based on an output current $i_o$ flowing through the motor 250 or a DC link voltage Vdc across the DC link capacitor C. In this case, the output current $i_o$ may be detected by an output current detector E, and the DC link voltage Vdc may be detected by the DC link voltage detector B.

The output current detector E may detect the output current $i_o$ flowing between the inverter 220 and the motor 250. That is, the output current detector E detects a current flowing through the motor 250. The output current detector E may detect output currents of all phases, namely, output currents $i_a$, $i_b$, and $i_c$. Alternatively, the output current detector E may detect output currents of two phases through balance among three phases.

The output current detector E may be arranged between the inverter 220 and the motor 250. For current detection, a current transformer (CT), a shunt resistor, etc. may be employed as the output current detector E.

The regenerative power consuming unit 270 is arranged between the capacitor C and the inverter 220, to consume regenerative power from the motor 250. In this regard, the regenerative power consuming unit 270 may be referred to as a "braking chopper".

The regenerative power consuming unit 270 may include a resistor and a switching element, which are arranged between opposite ends of the capacitor C. In addition, the regenerative power consuming unit 270 may further include a diode connected to the resistor in parallel.

Figure 5B:
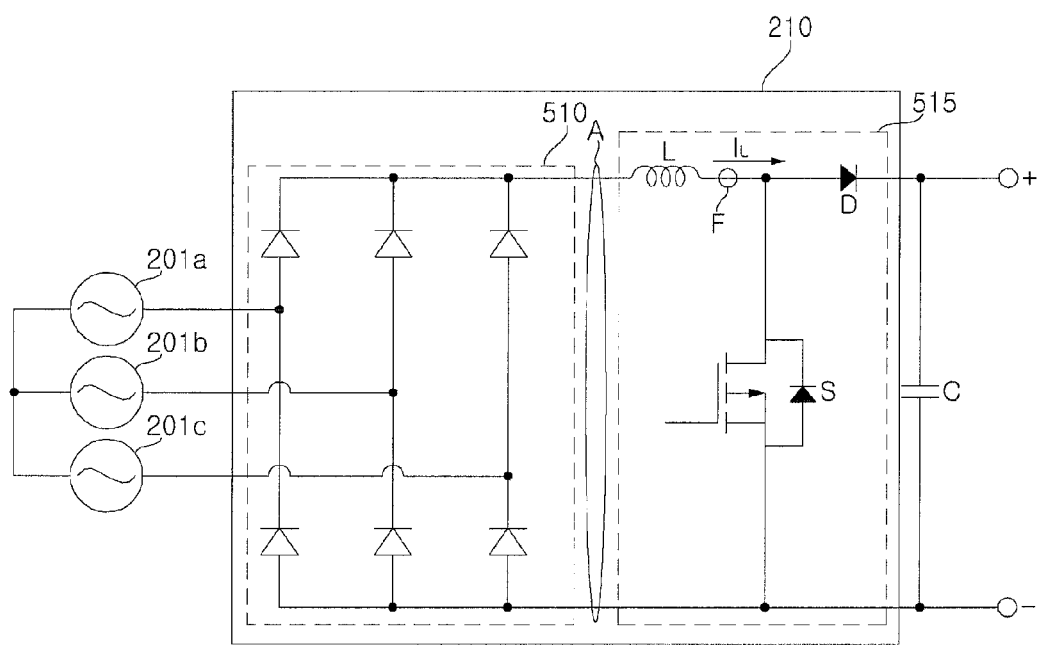
FIG. 5B is a circuit diagram illustrating an example of a converter illustrated in FIG. 3B.

Referring to FIG. 3B, a motor driving device 210 is illustrated. The motor driving device 210 is similar to that of FIG. 3A, except that the converter 210 further includes a boost converter 515 (FIG. 5B).

The boost converter 515 may include an inductor L and a diode D, which are connected in series between the rectifier 510 and the inverter 220. The boost converter 515 may further include a switching element S connected between the inductor L and the diode D. When the switching element S turns on, energy is stored in the inductor L. When the switching element S turns off, the energy stored in the inductor L may be output via the diode D.

In particular, in the motor driving device 200 using the low-capacitance DC link capacitor C, a voltage boosted to a certain level, namely, an offset voltage, may be output from the boost converter 515.

The converter controller 215 may control turning-on timing of the switching element S in the boost converter 515.

For this function, the converter controller 215 may output a converter switching control signal Scc for turning-on timing of the switching element S.

To this end, the converter controller 215 may receive an input voltage Vs from the input voltage detector A and an input current Is from the input current detector B.

Figure 4A:
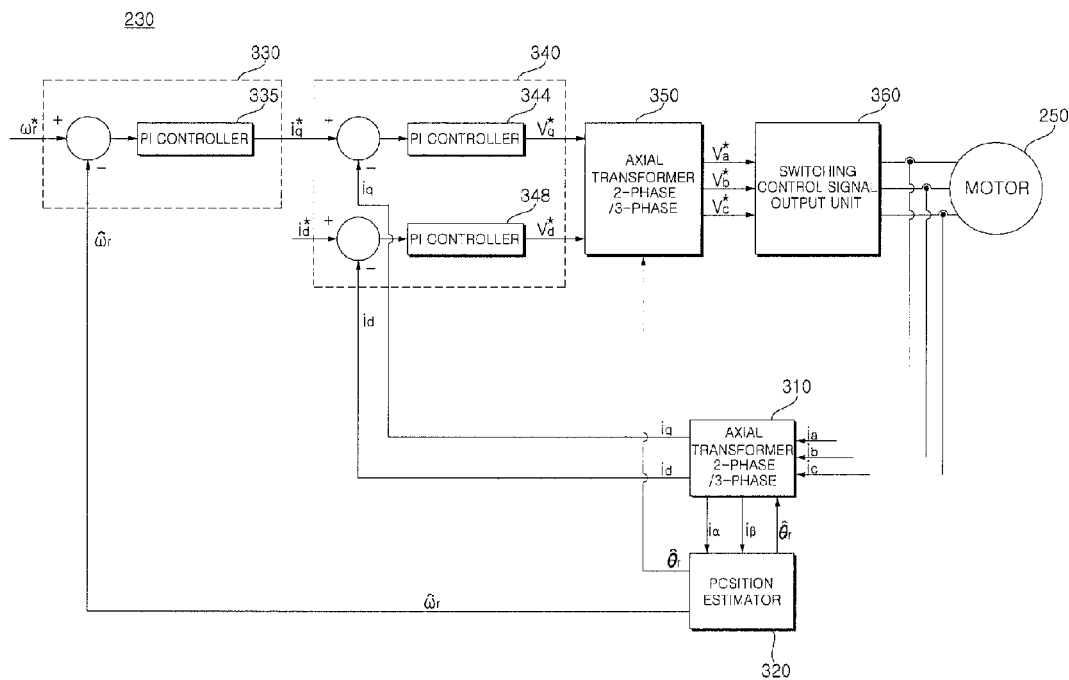
FIG. 4A is a block diagram illustrating a configuration of an inverter controller illustrated in FIG. 3A or 3B.

FIG. 4A is a block diagram illustrating a configuration of the inverter controller illustrated in FIG. 3A or 3B.

Referring to FIG. 4A, the inverter controller 230 may include an axial transformer 310, a position estimator 320, a current command generator 330, a voltage command generator 340, an axial transformer 350, and a switching control signal output unit 360.

The axial transformer 310 receives 3-phase output currents $i_a$, $i_b$, and $i_c$ detected by the output current detector E, and transforms the 3-phase output currents $i_a$, $i_b$, and $i_c$ into two-phase currents $i_\alpha$ and $i_\beta$ in a stationary reference frame.

Meanwhile, the axial transformer 310 may transform the two-phase currents $i_\alpha$ and $i_\beta$ in the stationary reference frame into 2-phase currents $i_d$ and $i_q$ in a rotating reference frame.

The position estimator 320 may estimate a rotor position $\hat{\theta}_r$ of the motor 250, based on the two-phase currents $i\alpha$ and $i\beta$ in the stationary reference frame, which is obtained in accordance with a transformation operation of the axial transformer 310. Based on the estimated rotor position $\hat{\theta}_r$, the position estimator 320 may also calculate a velocity $\hat{\omega}_r$, and output the calculated velocity $\hat{\omega}_r$.

Meanwhile, the current command generator 330 calculates a velocity command value $\omega^*_r$, based on the calculated velocity $\hat{\omega}_r$ and a target velocity $\omega$. The current command generator 330 also generates a current command value $i^*_q$, based on the velocity command value $\omega^*_r$. For example, the current command generator 330 may perform proportional-integral (PI) control through a PI controller 335 included therein, based on a difference between the calculated velocity $\hat{\omega}_r$ and the target velocity w, namely, the velocity command value $\omega^*_r$, and, as such, may generate a current command value $i^*_q$. Although the current command generator 330 generates the current command value $i^*_q$, namely, a q-axis current command value, it may be possible to generate a d-axis current command value $i^*_d$, together with the q-axis current command value $i^*_q$. The d-axis current command value $i^*_d$ may be set to "0".

Meanwhile, the current command generator 330 may further include a limiter (not shown) to limit the level of the current command value $i^*_q$ in order to prevent the current command value $i^*_q$ from being outside an allowable range.

The voltage command generator 340 generates d and q-axis voltage command values $v^*_d$ and $v^*_q$, based on the d and q-axis currents $i_d$ and $i_q$ generated through axial transformation to a 2-phase rotating reference frame in the axial transformer 310 and the current command values $i^*_d$ and $i^*_q$ from the current command generator 330. For example, the voltage command generator 340 may perform PI control through a PI controller 344 included therein, based on a difference between the q-axis current $i_q$ and the q-axis current command value $i^*_q$ and, as such, may generate a q-axis voltage command value $v^*_q$. The voltage command generator 340 may additionally perform PI control through a PI controller 348 included therein, based on a difference between the d-axis current $i_d$ and the d-axis current command value $i^*_d$ and, as such, may generate a d-axis voltage command value $v^*_d$. When the d-axis current command value $i^*_d$ is set to "0", the d-axis voltage command value $v^*_d$ may be set to "0".

Meanwhile, the voltage command generator 340 may further include a limiter (not shown) to limit the levels of the voltage command values $v^*_d$ and $v^*_q$ in order to prevent the voltage command values $v^*_d$ and $v^*_q$ from being outside a predetermined range.

The generated d and q-axis voltage command values $v^*_d$ and $v^*_q$ are input to the axial transformer 350.

The axial transformer 350 receives the position $\hat{\theta}_r$ calculated by the position estimator 320 and the d and q-axis voltage command values $v^*_d$ and $v^*_q$ and, as such, performs axial transformation.

First, the axial transformer 350 performs transformation from a 2-phase rotating reference frame to a 2-phase stationary reference frame. In this case, the position $\hat{\theta}_r$ calculated by the position estimator 320 may be used.

The axial transformer 350 then performs transformation from a 2-phase stationary reference frame to a 3-phase stationary reference frame. Through the axial transformation, the axial transformer 350 outputs 3-phase output voltage command values v*a, v*b, and v*c.

The switching control signal output unit 360 generates an inverter switching control signal Sic according to PWM, based on the 3-phase output voltage command values v*a, v*b, and v*c.

The inverter switching control signal Sic output from the switching control signal output unit 360 may be converted into a gate drive signal in a gate driver (not shown). The gate drive signal may be input to the gate of each switching element in the inverter 220. As a result, the switching elements in the inverter 220 perform switching operations, respectively.

Figure 4B:
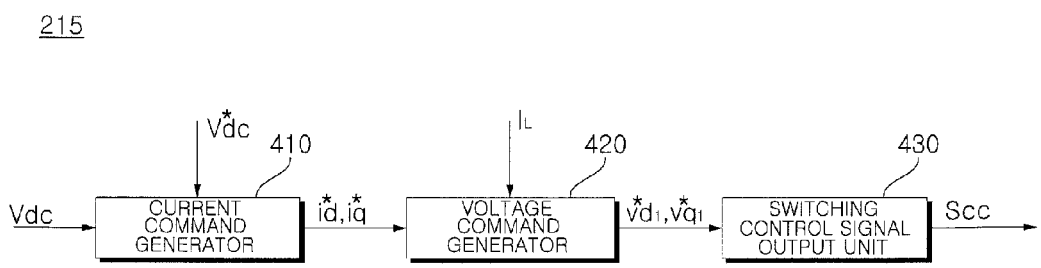
FIG. 4B is a block diagram illustrating a configuration of a converter controller illustrated in FIG. 3B.

FIG. 4B is a block diagram illustrating a configuration of the converter controller illustrated in FIG. 3B.

Referring to FIG. 4B, the converter controller 215 may include a current command generator 410, a voltage command generator 420, and a switching control signal output unit 430.

The current command generator 410 may generate d and q-axis current command values $i^*_d$ and $i^*_q$, based on a DC link voltage Vdc detected by the output voltage detector B, namely, the DC link voltage detector B and a DC link voltage command value V*dc, using a PI controller or the like.

The voltage command generator 420 generates d and q-axis voltage command values $v^*_{d1}$ and $v^*_{q1}$, based on the d and q-axis current commands $i^*_d$ and $i^*_q$ and an input current $i_L$, using a PI controller or the like.

The switching control signal output unit 430 may output, to the boost converter 515 (FIG. 5A), a converter switching control signal Scc for driving of a boost switching element S included in the boost converter 515, based on the d and q-axis voltage command values $v^*_{d1}$ and $v^*_{q1}$.

FIG. 5A is a circuit diagram illustrating an example of the converter illustrated in FIG. 3A.

Referring to FIG. 5A, the converter 210 may include the rectifier 510, which receives 3-phase AC power 201a, 201b and 201c, and rectifies the received 3-phase AC power 201a, 201b and 201c.

The rectifier 510 may include a 3-phase bridge diode. In this connection, FIG. 5A illustrates a configuration of the rectifier 510 in which three pairs of arm switching elements are connected in parallel, and each arm switching element pair includes an upper arm switching element and a lower arm switching element, which are connected in series, such that the arm switching elements are connected in a bridged manner.

FIG. 5B is a circuit diagram illustrating an example of the converter illustrated in FIG. 3B.

Referring to FIG. 5B, the converter 210 may include the rectifier 510, which receives 3-phase AC power 201a, 201b and 201c, and rectifies the received 3-phase AC power 201a, 201b and 201c, and the boost converter 515.

As described above, the boost converter 515 may include the inductor L, the diode D connected to the inductor L, and the switching element S connected between the inductor L and the diode D.

Meanwhile, an input voltage detector A for detection of an input voltage may be arranged between the rectifier 510 and the boost converter 515. In addition, a current detector F for detection of a current flowing through the inductor L may be arranged between the inductor L and the switching element S.

DC power converted by the converter 210 is output to the capacitor C connected to the output terminal of the converter 210, and is stored in the capacitor C.

FIGS. 6A to 6D are diagrams explaining operation of the motor driving device illustrated in FIG. 5B.

Figure 6A:
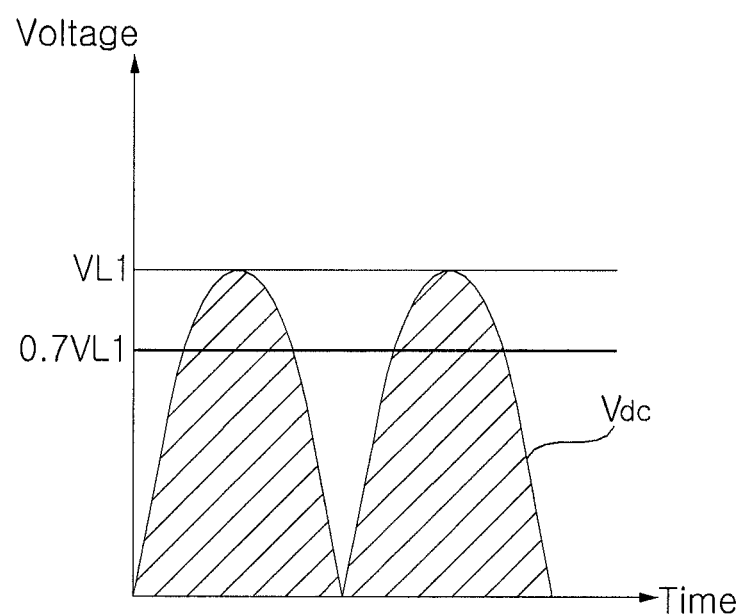
FIGS. 6A to 6D are diagrams explaining operation of the motor driving device illustrated in FIG. 5B.

FIG. 6A illustrates a DC link voltage Vdc generated in the case in which the low-capacitance DC link capacitor C is connected to the rectifier 510 without using the boost converter 515 of FIG. 5B, as illustrated in FIG. 5A.

When the low-capacitance DC link capacitor C is used, the DC link voltage Vdc cannot be smoothed by the low-capacitance DC link capacitor C and, as such, is directly applied in a pulsating state to the inverter 220.

In this case, the pulsating DC link voltage Vdc has an average voltage level of about 0.7VL1 lower than a peak voltage level VL1.

The inverter 220 may generate 3-phase AC power, using a voltage of about 0.7 VL1. However, it is difficult to achieve smooth motor driving at a voltage level lower than about 0.7 VL1. For this reason, voltage usage rate becomes low.

Meanwhile, when an input voltage has a frequency of about 60 Hz, voltage ripple of about 120 Hz corresponding to twice the frequency of the input voltage may be generated.

Figure 6B:
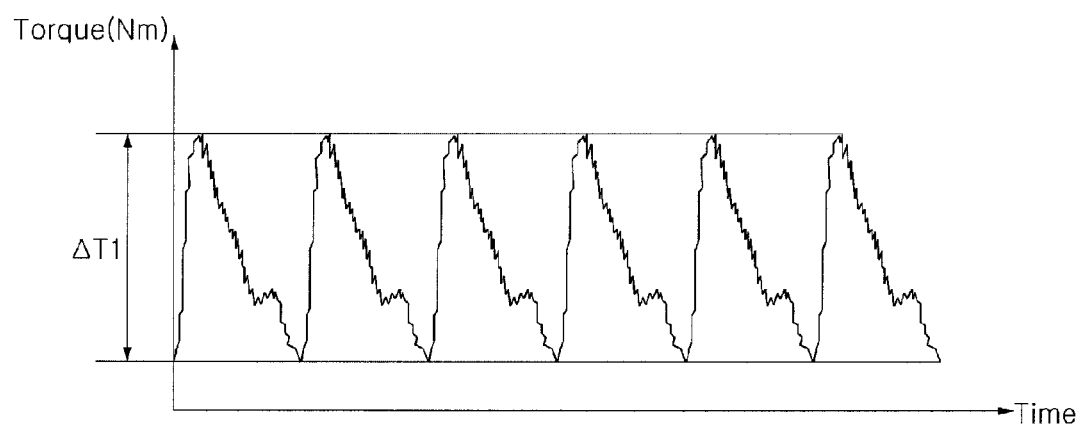

When the motor 250 is driven though the inverter 220, using a pulsating voltage as illustrated in FIG. 6A, torque ripple corresponding to ΔT1 is generated, as illustrated in FIG. 6B. Due to such torque ripple, vibration and noise are generated.

Meanwhile, when the low-capacitance DC link capacitor C has a reduced capacitance, current control thereof may be impossible and, as such, low input power factor characteristics may be exhibited.

In order to solve such a problem, 3-phase input power is used as an input power in the present invention. Since an input power having a higher voltage than single-phase power is used, voltage usage rate is practically increased.

To this end, in the present invention, the boost converter 515 is arranged downstream of the rectifier 510, as illustrated in FIG. 5B.

Figure 6C:
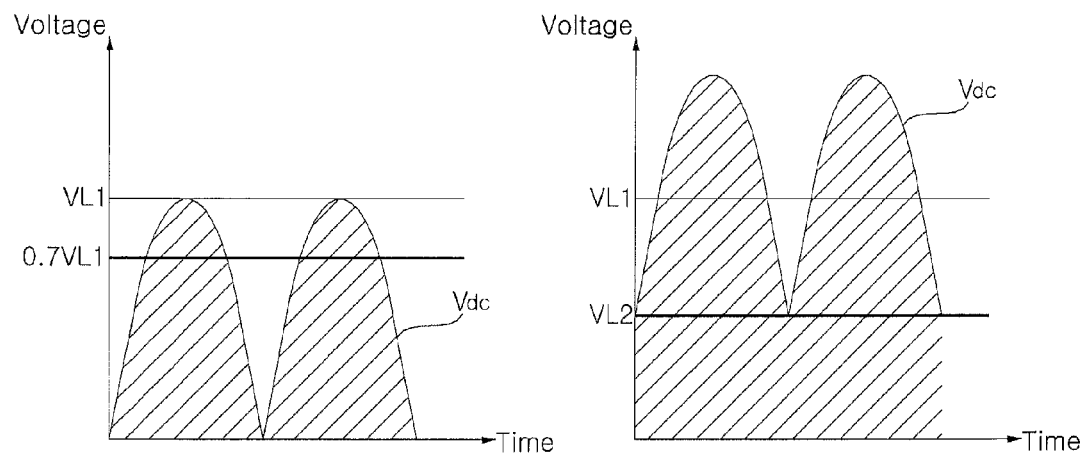

FIG. 6C illustrates a DC link voltage Vdc generated in the case in which the boost converter 515 and low-capacitance DC link capacitor C are used.

When the DC link voltage Vdc is boosted by VL2, using the boost converter 515, a pulsating voltage having a minimum voltage level of VL2 and a peak voltage level of VL2+VL1 is output to a DC link. In this case, the DC link voltage Vdc has an average voltage level of about VL1.

Since the inverter 220 generates 3-phase AC power, using a voltage of about VL1, it may be possible to achieve smooth motor driving in a large portion of the overall voltage period. Accordingly, increased voltage usage rate is exhibited. In addition, an operation range of the motor is widened.

Figure 6D:
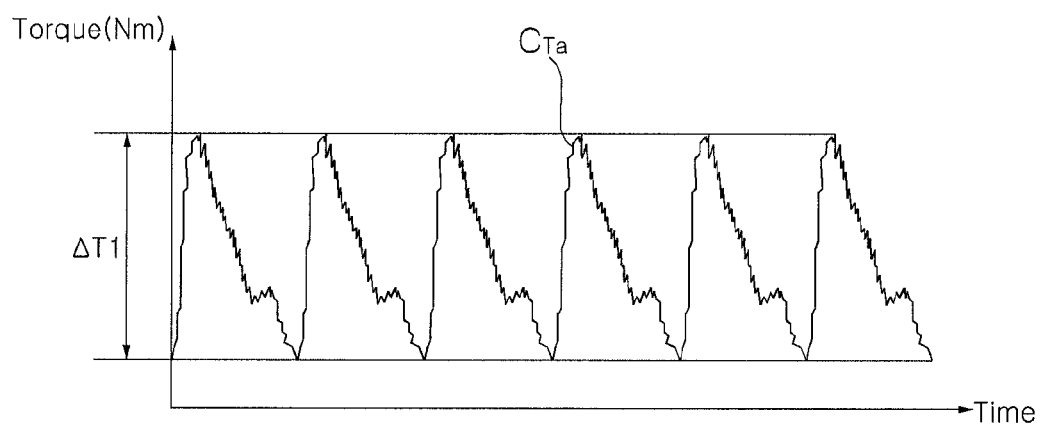
Figure 6D:
Figure 6D:
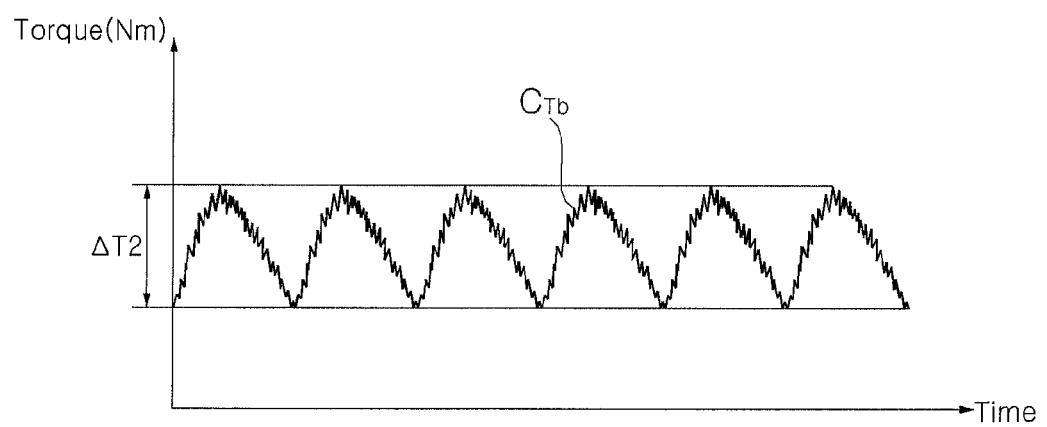

When the motor 250 is driven though the inverter 220, using a DC link voltage Vdc generated in accordance with use of the boost converter 515 and the low-capacitance DC link capacitor C, as illustrated in FIG. 6C, torque ripple corresponding to ΔT2 smaller than ΔT1 may be generated, as illustrated in FIG. 6D. That is, torque ripple is considerably reduced in this case.

Meanwhile, when the boost converter 515 is used, input current Is is controlled and, as such, an improvement in input power factor is achieved.

On the other hand, when 3-phase AC power is used as input power, the voltage across the low-capacitance DC link capacitor C is pulsated by the low-capacitance DC link capacitor C. As a result, a high DC link voltage is generated.

When the motor 250 is abruptly stopped, or misses step movement, regenerative power from the motor 250 may be applied to the DC link capacitor C and, as such, the voltage across the DC link capacitor C may be excessively increased.

As a result, the circuit elements in the motor driving device 200 may be damaged.

In order to solve this problem, a regenerative power consuming unit is arranged between the DC link capacitor C and the inverter 220 in accordance with the present invention. Hereinafter, this will be described with reference to FIG. 7.

Figure 7:
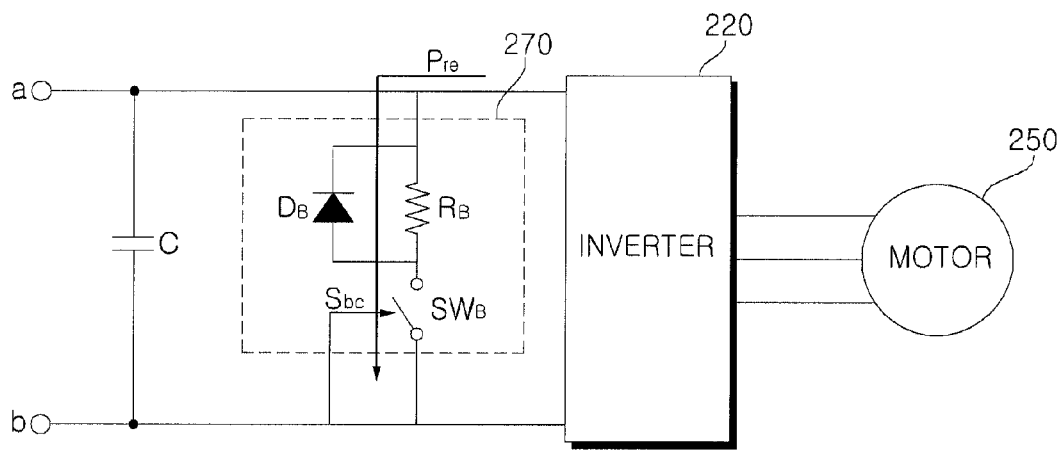
FIG. 7 is a circuit diagram illustrating an example of a regenerative power consuming unit according to an embodiment of the present invention.

FIG. 7 is a circuit diagram illustrating an example of the regenerative power consuming unit according to an embodiment of the present invention. FIGS. 8A to 9B are circuit diagrams explaining operation of the regenerative power consuming unit illustrated in FIG. 7.

Referring to FIG. 7, the regenerative power consuming unit, which is designated by reference numeral "270", is arranged between the capacitor C and the inverter 220, to consume regenerative power from the motor 250. In this regard, the regenerative power consuming unit 270 may also be referred to as a "braking chopper".

The regenerative power consuming unit 270 may include a resistor $R_B$ and a switching element Swa, which are arranged between opposite ends of the capacitor C. The regenerative power consuming unit 270 may further include a diode $D_B$ connected to the resistor $R_B$ in parallel.

When the DC link voltage has a level equal to or higher than a predetermined value, the switching element Swa of the regenerative power consuming unit 270 is turned on and, as such, regenerative power Pre from the motor 250 is consumed by the resistor $R_B$.

Meanwhile, the first scheme to determine whether the DC link voltage has a level equal to or higher than the predetermined value is a method in which the inverter controller 230 executes the determination in a software manner.

Since the DC link voltage Vdc detected by the DC link voltage detector B is input to the inverter controller 230, the inverter controller 230 may determine whether the DC link voltage has a level equal to or higher than the predetermined value, through comparison of the level of the DC link voltage with a level stored in a memory. When the DC link voltage has a level equal to or higher than the predetermined value, the inverter controller 230 may generate a switching control signal Sbc for driving of the switching element Swa.

On the other hand, the second scheme to determine whether the DC link voltage has a level equal to or higher than the predetermined value is a method in which the determination is executed in a hardware manner.

Figure 8A:
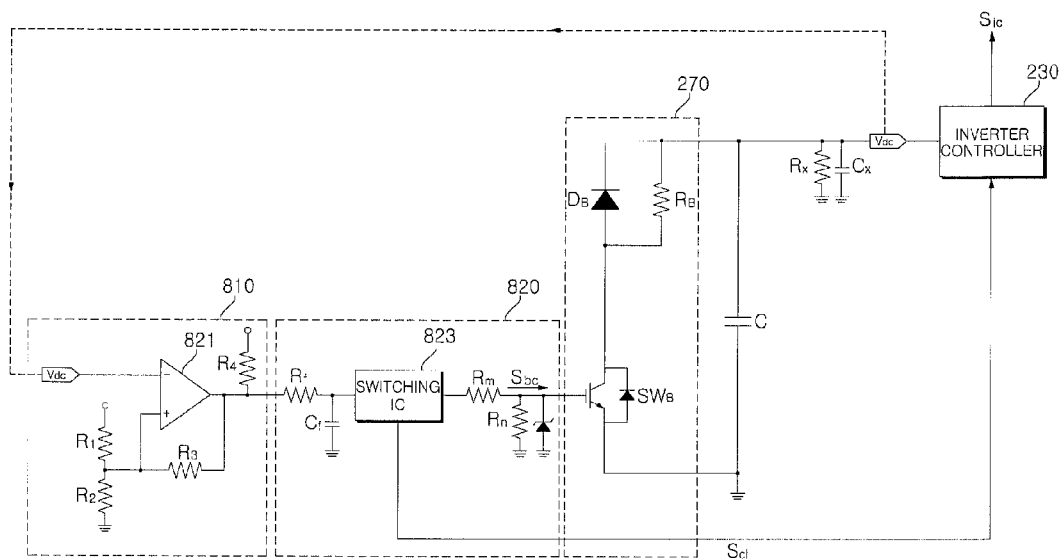
FIGS. 8A to 9B are circuit diagrams explaining operation of the regenerative power consuming unit illustrated in FIG. 7.

FIG. 8A illustrates a driving circuit for generating the switching control signal Sbc for driving of the switching element Swa.

The driving circuit may include an over-voltage sensing unit 810 and a switching driving unit 820.

The over-voltage sensing unit 810 may include a plurality of resistors R1, R2, R3, and R4, and an operational amplifier 821.

The operational amplifier 821 may receive, at one input terminal thereof, a DC link voltage Vdc detected by the DC link voltage detector B. The other input terminal of the operational amplifier 821 may be connected to the resistors R1, R2, and R3.

In accordance with a resistance distribution ratio among the resistors R1, R2, and R3, a reference value for over-voltage is determined. The operational amplifier 821 compares the DC link voltage Vdc with the reference value, namely, the predetermined value, to determine whether the DC link voltage Vdc has a level equal to or higher than the predetermined value, and outputs a comparison signal representing results of the comparison. For example, when the DC link voltage Vdc is over-voltage, the operational amplifier 821 outputs a signal having a first level. On the other hand, when the DC link voltage Vdc is not over-voltage, the operational amplifier 821 outputs a signal having a second level.

The switching driving unit 820 receives a signal from the over-voltage sensing unit 810, and generates a switching control signal Sbc for driving of the switching element Swa, based on the received signal.

In addition, in response to the signal received from the over-voltage sensing unit 810, the switching driving unit 820 generates an operation control signal Sci for controlling operation of the inverter controller 230.

That is, when the voltage Vdc across the capacitor C is equal to or higher than a predetermined voltage Vref, the switching driving unit 820 outputs the switching control signal Sbc to the switching element $SW_B$ of the regenerative power consuming unit 270 while outputting the operation control signal Sci to the inverter controller 230.

For example, the operation control signal Sci output to the inverter controller 230 when the voltage Vdc across the capacitor C is equal to or higher than the predetermined voltage Vref may include a disable signal Sda for stopping inverter operation.

In another example, when the voltage Vdc across the capacitor C is lower than the predetermined voltage Vref, the switching driving unit 820 may output an enable signal Sea for inverter operation, without outputting the switching control signal Sbc to the regenerative power consuming unit 270.

For the above-described functions, the switching driving unit 820 may include a resistor Rf, a capacitor Cf, and a switching integrated circuit (IC) 823, for low-pass filtering. The switching driving unit 820 may further include resistors Rm and Rn for voltage distribution.

In the switching driving unit 820, the signal from the over-voltage sensing unit 810 is low-pass-filtered through the resistor Rf and capacitor Cf, and is then input to the switching IC 823. The switching IC 823 generates a switching control signal Sbc for driving of the switching element Swa of the regenerative power consumer 270 in accordance with the level of the signal input to the switching IC 823, and outputs the switching control signal Sbc.

The switching control signal Sbc is input to a gate terminal of the switching element Swa in the regenerative power consuming unit 270 via resistors Rm and Rn. The switching element Swa of the regenerative power consuming unit 270 is turned on when the DC link voltage Vdc is equal to or higher than the predetermined voltage. In this state, accordingly, the resistor RB may consume regenerative power from the motor 250.

Figure 8B:
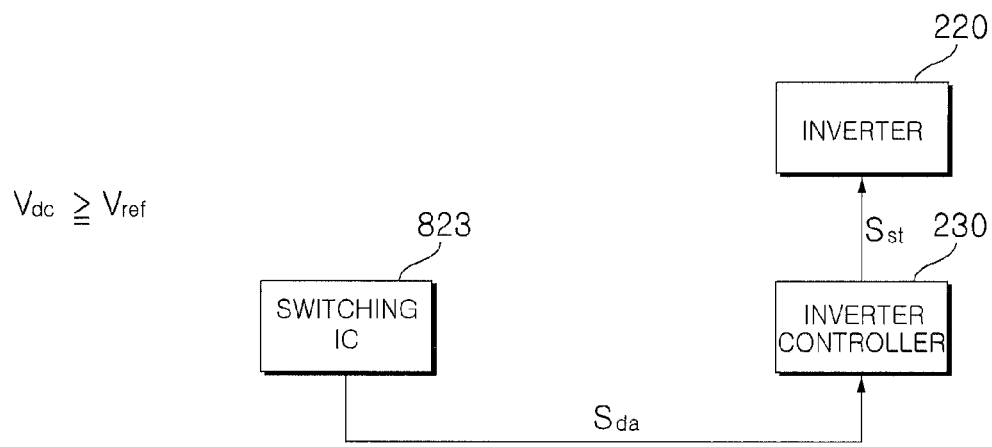

FIG. 8B illustrates the case in which the voltage Vdc across the capacitor C is equal to or higher than the predetermined voltage Vref.

Referring to FIG. 8B, the switching driving unit 820 may generate the disable signal Sda for stopping operation of the inverter 220 when the voltage Vdc across the capacitor C is equal to or higher than the predetermined voltage Vref.

Accordingly, the inverter controller 230 may output or may not output an operation stop signal Sst to the inverter 220. Thus, operation of the inverter 220 may be stopped during consumption of regenerative power.

Figure 8C:
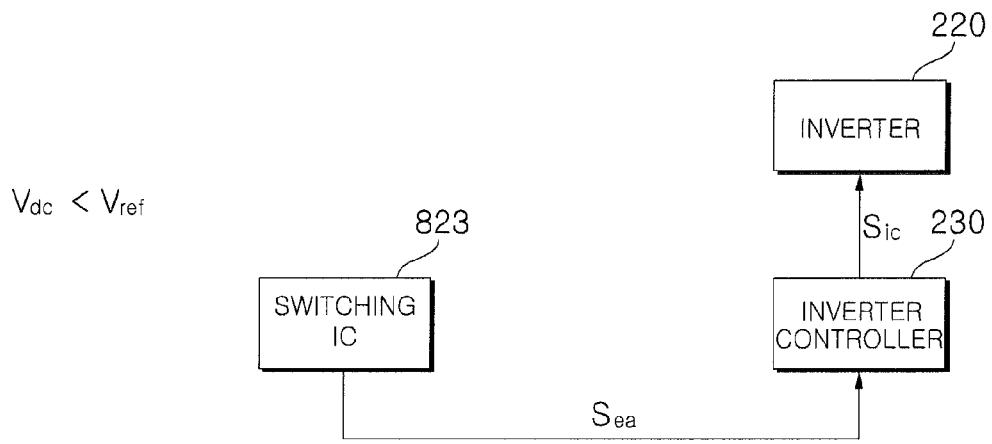

FIG. 8C illustrates the case in which the voltage Vdc across the capacitor C is lower than the predetermined voltage Vref.

When the voltage Vdc across the capacitor C is lower than the predetermined voltage Vref, the switching driving unit 820 does not output the switching control signal Sbc to the regenerative power consuming unit 270. In this case, the switching driving unit 820 may output the enable signal Sea for operation of the inverter 220.

Accordingly, the inverter controller 230 may output an inverter switching control signal Sic to the inverter 220, to drive the inverter 220. Thus, the inverter 220 may normally operate when regenerative power is consumed.

Figure 9A:
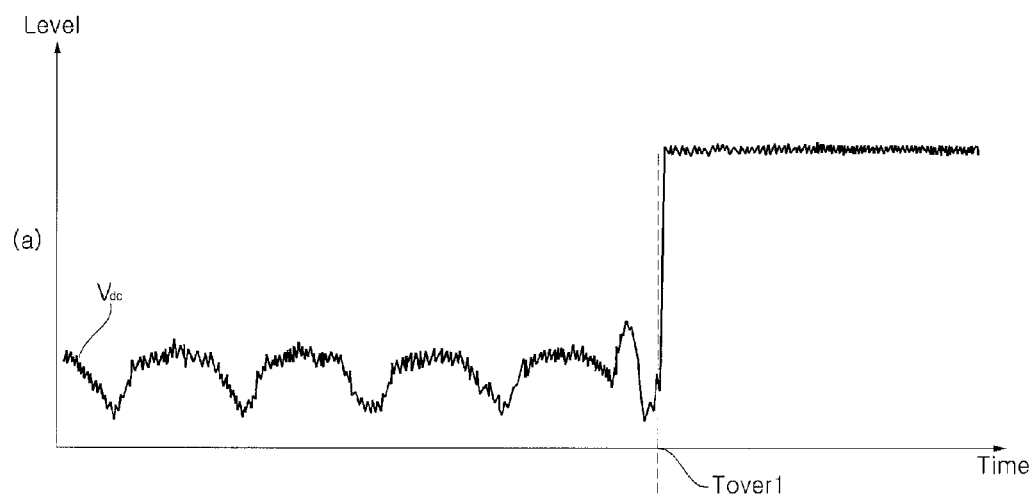
Figure 9A:
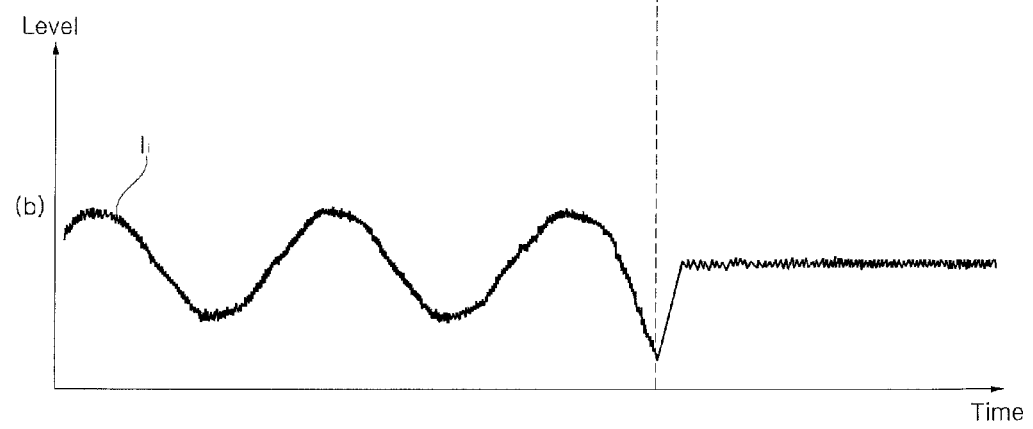

FIG. 9A illustrates an example of step missing of the motor 250 and waveforms of the DC link voltage Vdc and the phase current Ii of the motor 250 when regenerative power from the motor 250 is supplied to the DC link capacitor C upon step missing of the motor 250.

Referring to FIG. 9A, the voltage Vdc across the DC link capacitor C momentarily reaches over-voltage at a time Tover1 and, as such, an AC phase current Ii cannot be supplied to the motor 250.

In this case, the possibility that the circuit elements in the motor driving device 200 are damaged is considerably increased.

Figure 9B:
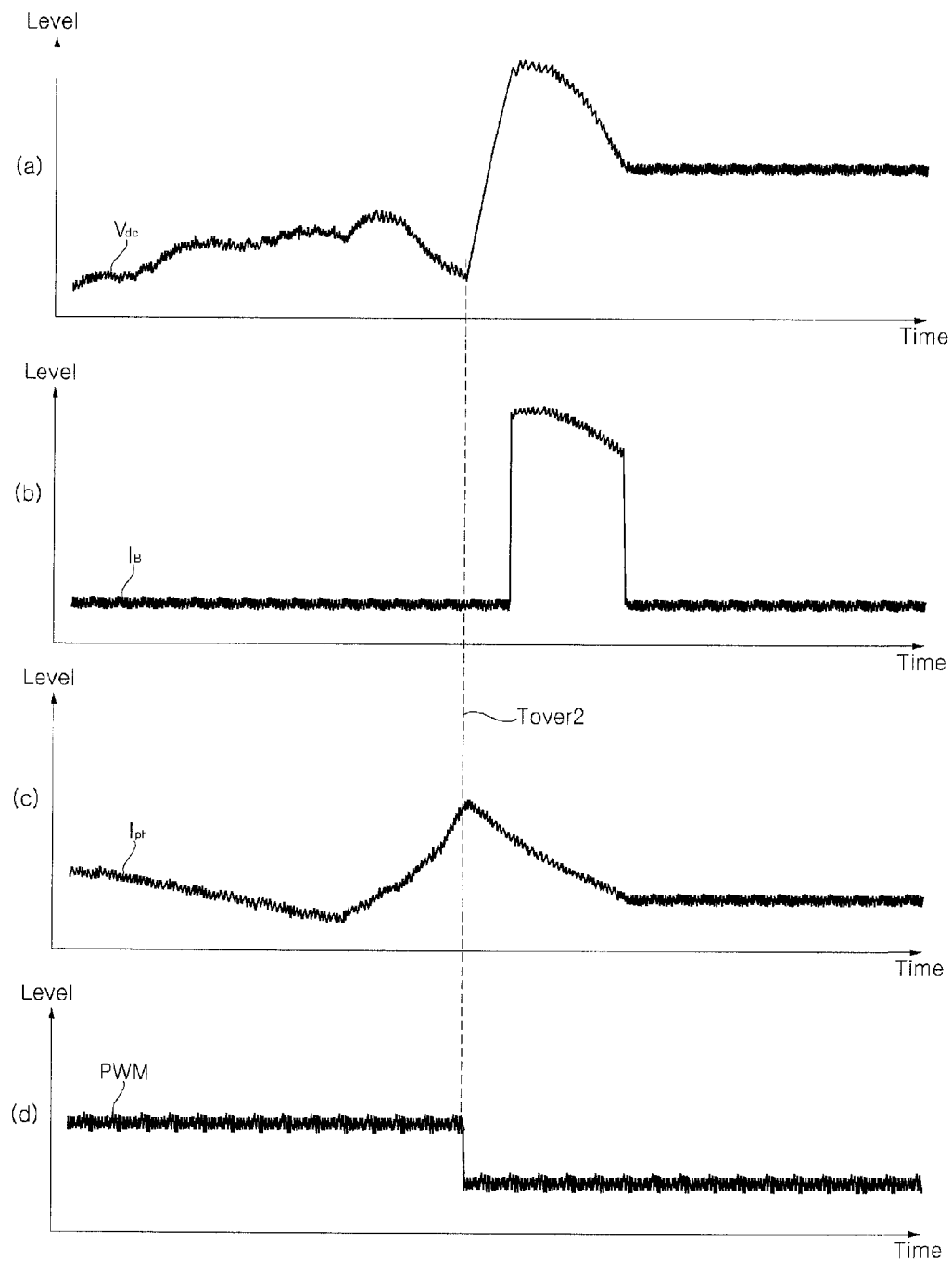

FIG. 9B illustrates an example of step missing of the motor 250 and waveforms of the DC link voltage Vdc when regenerative power from the motor 250 is supplied to the DC link capacitor C upon step missing of the motor 250.

Referring to FIG. 9B(a), the voltage Vdc across the DC link capacitor C begins to increase at a time Tover2.

The DC link voltage detector B detects the increasing DC link voltage Vdc. When the over-voltage sensing unit 810 senses a DC link voltage Vdc equal to or higher than the predetermined voltage, the switching element $S_B$ of the regenerative power consuming unit 270 is turned on. As a result, the current flowing through the resistor $R_B$ in the regenerative power consuming unit 270, namely, a current $I_B$, is momentarily increased after the time Tover2, as illustrated in FIG. 9B(b).

After regenerative power is completely consumed, the current $I_B$ flowing through the resistor $R_B$ in the regenerative power consuming unit 270 is again decreased and, as such, the switching element $S_B$ of the regenerative power consuming unit 270 is turned off.

FIGS. 9B(c) and 9B(d) illustrate a phase current Iph and a PWM signal PWM, respectively. Referring to FIGS. 9B(c) and 9B(d), it may be seen that the waveforms of the phase current Iph and PWM signal PWM are stabilized after the time Tover2 in accordance with operation of the regenerative power consuming unit 270.

Figure 10:
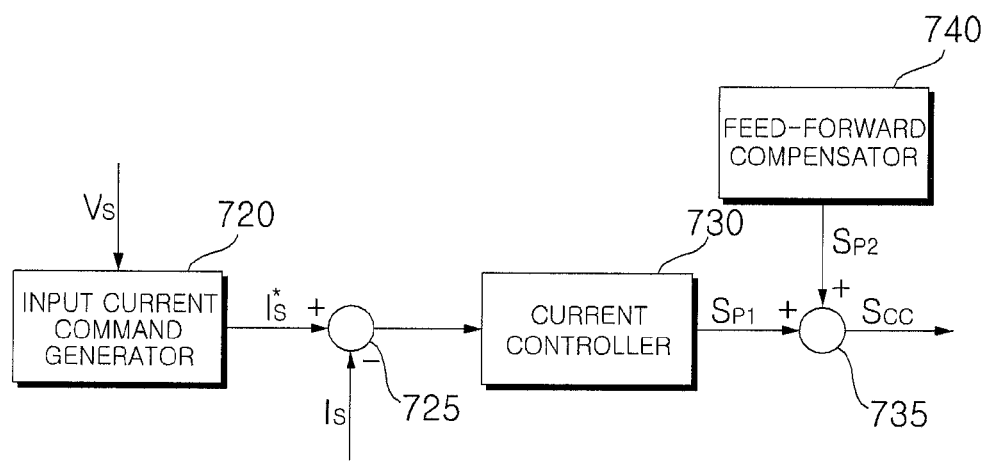
FIG. 10 is a block diagram illustrating an example of the inner configuration of the converter controller illustrated in FIG. 3B.

FIG. 10 is a block diagram illustrating an example of the inner configuration of the converter controller illustrated in FIG. 3B.

Referring to FIG. 10, the converter controller 215 may include an input current command generator 720, a current controller 730, and a feed-forward compensator 740.

The input current command generator 720 may receive an input voltage Vs detected by the input voltage detector A, and may generate an input current command value i*s, based on the received input voltage Vs.

Meanwhile, the converter controller 215 may further include a substractor 725 to calculate a difference between the input current command value I*s and the input current Is detected by the input current detector D. The substractor 725 applies the calculated difference to the current controller 730.

The current controller 730 generates a first switching control signal Sp1 corresponding to a first duty, based on the input current command value I*s and an input current Is detected by the input current detector D.

In detail, the current controller 730 generates the first switching control signal corresponding to the first duty, based on a difference between the input current command value I*s and the input current Is.

Meanwhile, the feed-forward compensator 740 executes feed-forward compensation in order to remove disturbance of the input voltage Vs from the boost converter 515 and the DC link voltage Vdc. Accordingly, the feed-forward compensator 740 may generate a second switching control signal Sp2 corresponding to a second duty, taking into consideration removal of voltage disturbance.

The converter controller 215 may further include an adder 735 to add the second switching control signal Sp2 to the first switching control signal Sp1. The adder 735 may output a converter switching control signal Scc, based on results of the addition. That is, the adder 735 may output the converter switching control signal Scc, taking into consideration the first and second duties. In accordance with the converter switching control signal Scc, the boost converter 515 operates.

Meanwhile, the operation method of the motor driving device or air conditioner according to the present invention can be realized as code, which can be written on a recording medium that can be read by a processor equipped in the motor driving device or air conditioner and can be read by a processor. The recording medium that can be read by a processor includes all kinds of recording media, on which data that can be read by a processor is written, such as a read only memory (ROM), a random access memory (RAM), a CD-ROM, a magnetic tape, a floppy disk, an optical data storage, and a carrier wave type (e.g., transmission over the Internet). The recording medium that can be read by a processor can be distributed to computer systems connected to one another on a network, and codes that can be read by a processor can be stored in the recording medium in a distributed manner and executed.

As apparent from the above description, in accordance with the present invention, the above-described motor driving device and the air conditioner including the same may achieve consumption of regenerative power through a configuration including a rectifier to rectify input AC power, a boost converter to boost power rectified by the rectifier, a capacitor to store a pulsating voltage from the boost converter, an inverter including a plurality of switching elements, the inverter transforming AC power, using a voltage across the capacitor, and outputting the transformed power to a motor, a regenerative power consuming unit arranged between the capacitor and the inverter, to consume regenerative power from the motor, and a switching driving unit to output a switching control signal to a switching element in the regenerative power consuming unit while outputting an operation control signal to an inverter controller when the voltage across the capacitor is equal to or higher than a predetermined voltage.

In particular, when the voltage across the capacitor is pulsated due to a small capacitance of the capacitor, the regenerative power consuming unit operates in accordance with detection of the voltage across the capacitor and, as such, stability of the circuit elements in the motor driving device is enhanced.

In particular, when high voltage is sensed across the capacitor, the regenerative power consuming unit operates and, as such, stability of the circuit elements in the motor driving device is enhanced.

In addition, operation of the inverter may be stopped during consumption of regenerative power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A motor driving device comprising:
 a rectifier to rectify input alternate current (AC) power;
 a boost converter to boost power rectified by the rectifier;
 a capacitor to store a voltage from the boost converter;
 an inverter that includes a plurality of switching elements, the inverter to transform AC power, using a voltage across the capacitor, and to provide the transformed power to a motor;
 a regenerative power consuming device, between the capacitor and the inverter, to consume regenerative power from the motor, the regenerative power consuming device includes a switching element;
 an inverter controller to control the inverter; and
 a switching driving device to provide a switching control signal to the switching element of the regenerative power consuming device and to provide an operation control signal to the inverter controller when the voltage across the capacitor is equal to or greater than a predetermined voltage.

2. The motor driving device according to claim 1, wherein the operation control signal is a disable signal to stop operation of the inverter.

3. The motor driving device according to claim 1, wherein when the voltage across the capacitor is less than the predetermined voltage, the switching driving device provides, to the inverter controller, an enable signal to operate the inverter without providing the switching control signal to the regenerative power consuming device.

4. The motor driving device according to claim 1, wherein a first end of the capacitor is coupled to a first node, and a second end of the capacitor is coupled to a second node, wherein the regenerative power consuming device includes a resistor and the switching element coupled in series between the first node and the second node.

5. The motor driving device according to claim 4, wherein the regenerative power consuming device further includes a diode coupled in parallel to the resistor.

6. The motor driving device according to claim 1, further comprising:
   a voltage detector to detect the voltage across the capacitor; and
   an over-voltage sensing unit to determine whether the detected voltage is equal to or greater than the predetermined voltage,
   wherein the switching driving device provides the switching control signal to the switching element of the regenerative power consuming device while providing the operation control signal to the inverter controller, based on a signal from the over-voltage sensing unit when the voltage across the capacitor is equal to or greater than the predetermined voltage.

7. The motor driving device according to claim 1, wherein the capacitor is a film capacitor.

8. The motor driving device according to claim 1, further comprising:
   an input current detector to detect input current from the input AC power;
   an input voltage detector to detect input voltage from the input AC power; and
   a converter controller to provide a converter control signal to control a switching element of the boost converter, based on the detected input current and the detected input voltage.

9. The motor driving device according to claim 8, wherein the converter controller includes:
   an input current command generator to provide, based on the detected input voltage, an input current command value; and
   a current controller to provide a first switching control signal, based on the input current command value and the detected input current.

10. The motor driving device according to claim 9, wherein:
   the converter controller further includes a feed-forward compensator to provide a second switching control signal; and
   the converter controller provides the converter switching control signal, based on the first switching control signal and the second switching control signal.

11. The motor driving device according to claim 1, wherein the input AC power is 3-phase AC power.

12. An air conditioner comprising:
   a compressor to compress refrigerant;
   a compressor motor;
   a heat exchanger to perform heat exchange using the compressed refrigerant; and
   a compressor motor driving device to control the compressor motor,
   wherein the compressor motor driving device includes:
      a rectifier to receive alternate (AC) power;
      a boost converter to boost power from the rectifier;
      a capacitor to store power from the boost converter;
      an inverter that includes a plurality of switching elements, the inverter to transform AC power to direct current (DC) power, based on voltage across the capacitor, and to provide the transformed power to the compressor motor;
      a regenerative power consuming device to consume regenerative power from the motor, wherein the regenerative power consuming device is between the capacitor and the inverter, and the regenerative power consuming device includes a switching element;
      an inverter controller to control the inverter; and
      a switching driving device to provide a switching control signal to the switching element and to provide an operation control signal to the inverter controller when the voltage across the capacitor is equal to or greater than a predetermined voltage.

13. The air conditioner according to claim 12, wherein the operation control signal is a disable signal to stop operation of the inverter.

14. The air conditioner according to claim 12, wherein when the voltage across the capacitor is less than the predetermined voltage, the switching driving device provides an enable signal for operation of the inverter without providing the switching control signal.

15. The air conditioner according to claim 12, wherein a first end of the capacitor is coupled to a first node, and a second end of the capacitor is coupled to a second node, wherein the regenerative power consuming device includes a resistor and the switching element coupled in series between the first node and the second node,
   wherein the regenerative power consuming device further includes a diode coupled in parallel to the resistor.

16. The air conditioner according to claim 12, further comprising:
   a voltage detector to detect the voltage across the capacitor; and
   an over-voltage sensing unit to determine whether the detected voltage is equal to or greater than the predetermined voltage,
   wherein the switching driving device provides the switching control signal while providing the operation control signal to the inverter controller, based on a signal from the over-voltage sensing unit when the voltage across the capacitor is equal to or greater than the predetermined voltage.

17. The air conditioner according to claim 12, wherein the capacitor is a film capacitor.

18. The air conditioner according to claim 12, further comprising:
   an input current detector to detect input current from the input AC power;
   an input voltage detector to detect input voltage from the input AC power; and
   a converter controller to provide a converter control signal to control a switching element of the boost converter, based on the detected input current and the detected input voltage.

19. The air conditioner according to claim 18 wherein the converter controller includes:

an input current command generator to provide, based on the detected input voltage, an input current command value; and a current controller to provide a first switching control signal, based on the input current command value and the detected input current.

20. The air conditioner according to claim 19, wherein:

the converter controller further includes a feed-forward compensator to provide a second switching control signal; and the converter controller provides the converter switching control signal, based on the first switching control signal and the second switching control signal.

* * * * *